INVENTOR
Daniel L. Jaffe

BY Claude Funkhouser
ATTORNEY

3,276,332
HYDRAULIC ROTARY ACTUATOR CAPABLE OF
TAKING HIGH BENDING MOMENTS
Daniel L. Jaffe, Bethesda, Md., assignor, by mesne assignments, to the United States of America as represented by the Secretary of the Navy
Filed Sept. 3, 1963, Ser. No. 306,391
2 Claims. (Cl. 92—122)

This invention relates to an actuating device and more particularly to a new and improved fluid actuator of the rotary type which is adapted for the movement of control surfaces and other components of aircraft and other vehicles.

The present invention is directed to an improved hydraulic rotary actuator capable of taking high bending moments and of a size particularly well suited for the support and actuation of aircraft control surfaces. The improved actuator of the present invention is of such compact and sturdy construction that it is especially adapted to be completely housed within the missile adjacent the control surface of the airborne vehicle and operatively connected thereto. The improved actuator is particularly constructed and fitted for operation of the control surfaces of high speed aircraft, wherein the hydraulic operation thereof requires but relatively small pilot forces to instantaneously operate the control surfaces of the aircraft. Moreover, the invention provides a rotary actuator which is capable of taking high moment loads as well as high torque loads and yet be able to utilize an inexpensive sealing method.

The device of the present invention comprises two concentric shafts, one used to transmit torque, the other used to support the moment on the end of the shaft, a suitable clearance being allowed between the shafts so that there will be no cross-loading from one shaft to the other.

An object of the invention is to provide a new and improved fluid motor of the vaned impeller type.

Another object of the invention is to provide an improved fluid actuator of the rotary type for actuating the control surfaces of an aircraft.

Still another object of the invention is to provide a hydraulic rotary actuator which is capable of taking high moment loads as well as torque loads.

A further object of the invention is to provide a fluid motor having a pair of concentric shafts, one used to transmit torque, the other used to support the moment on the end of the shaft.

A still further object of the invention is to provide a fluid rotary actuator which is capable of taking high bending moments without occasioning undue wear on the journal bearings and/or leakage therefrom.

A still further object of the invention is to provide an inner supporting shaft for an aerodynamic surface, said shaft being capable of sustaining high bending moments and an outer shaft about said inner shaft and connected for torque transfer to the inner shaft said outer shaft being undisturbed by bending moments on said inner shaft.

Other objects, advantages and novel features of the invention will become apparent from the following detailed description of the invention when considered in conjunction with the accompanying drawings wherein.

Figure 1:
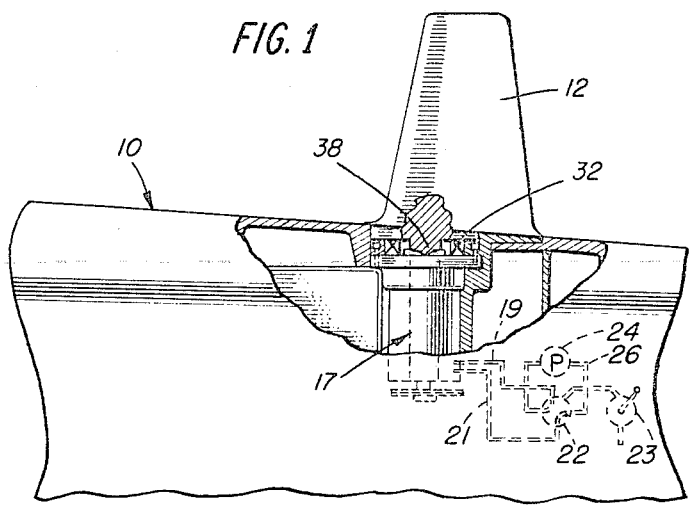
FIG. 1 is a plan view of a portion of an aircraft or missile illustrating the improved actuator and the manner in which the actuator supports a wholly movable surface, such as a tail surface or control surface.

Referring now to the drawings and more particularly to FIG. 1 thereof, the numeral 10 indicates an aircraft or missile body or fuselage having a control compartment or cockpit 11 disposed therein with an aerodynamic surface 12 carried by the moment shaft of the actuator and extending laterally from the body. The actuator 17 may be fixed to the fuselage or body in any conventional manner such, for example, as by bolts or the like and is preferably connected by suitable piping or conduits 19 and 21 to a fluid control valve disposed within the control compartment or cockpit 11 and actuated in any conventional manner such, for example, as by movement of a control stick or member 23 or electrically controlled autopilot operatively connected to the valve. It is to be noted in FIG. 1 that the valve 22 communicates with the actuator by means of aforesaid conduits 19 and 21, the fluid system also includes a pump 24 connected to the valve 22, as by conduits 25 and 26.

By this arrangement, it will be understood that one of the conduits will transmit fluid under pressure and the other conduit will provide the fluid return or release line for the movement of the aerodynamic surface 12 in a given direction and vice versa.

Figure 2:
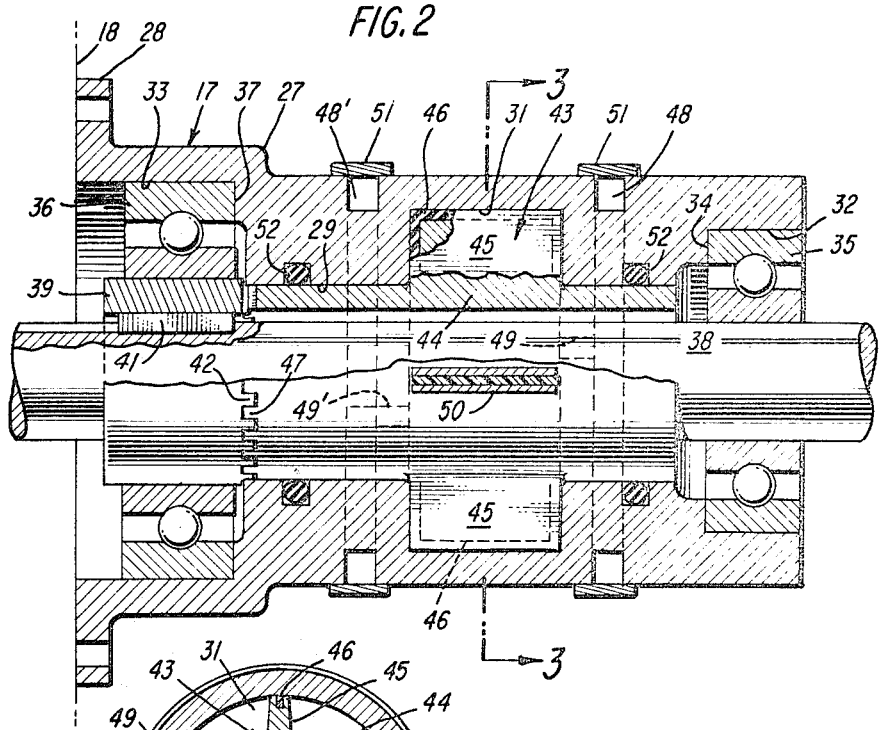
FIG. 2 is an enlarged longitudinal sectional view of the actuator of FIG. 1.
Figure 3:
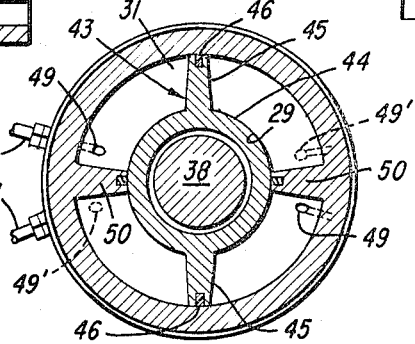
FIG. 3 is a transverse sectional view taken along the line 3—3 of FIG. 2.

Referring now to FIGS. 2 and 3, the fluid actuator 17 comprises a casing 27 having an attaching flange 28 formed on one end thereof whereby the actuator may be secured to the support 18. The casing 27 is further provided with a centrally disposed bore 29 having an enlarged impeller cavity or recess 31 in communication therewith and disposed substantially midway between the terminal ends of the casing. The casing further includes a raceway or recess 32 in one end and a similar raceway or recess 33 in the other end thereof, the raceways being in communication with the bore 29. Disposed within the recess 32 in abutting engagement with a shoulder 34 on the casing is suitable ball bearing assembly 35. A similar ball bearing assembly 36 is disposed within recess 33 in abutting engagement with a shoulder 37 on the casing.

An inner or moment shaft 38 is disposed within the casing 27 and carries an annular member or driven element 39 secured thereto, as by a key 41, the member 39 being disposed within the bearing assembly 36 and the shaft 38 being disposed within bearing assembly 35 and thus by this arrangement the shaft is supported within the casing for rotatable movement. The member 39 is provided with a face spline or toothed surface 42, the purpose of which will become more clearly apparent as the description proceeds.

An impeller or rotor assembly indicated generally by the numeral 43 is disposed within the casing 27 and comprises an outer elongated sleeve or tubular shaft 44 fitted into the bore 29 in spaced relation with respect to the inner shaft 38, the shaft 44 having a pair of diametrically opposed impeller vanes or blades 45 formed therewith. The blades 45 operate in cavity 31 formed in casing 27 and suitable sealing elements 46 carried by the vanes provide a sealing connection between the vanes and the cavity, as best shown in FIGS. 2 and 3. The blades 45 cooperate with a pair of diametrically disposed partitions or dams 50 fixed to or carried by the casing 27 and disposed in the operating chamber or cavity 31, as best shown in FIG. 3. The tubular or torque shaft 44 is provided on one end thereof with a face spline or toothed surface 47 in engagement with and cooperating with the toothed surface 42 on the annular member 39 to provide a driving connection therebetween.

The casing 27 is provided with a pair of annular fluid passageways or chambers 48 and 48', the chambers being disposed at opposite sides of the cavity 31 in fluid communication therewith, as by ports 49 and 49', the port 49 being shown in solid outline and the ports 49' being dashed outline, FIG. 3. The chamber 48 communicates with valve 22 by means of fluid conduit 19 while the chamber 48' communicates with valve 22 by means of conduit 21 and thus by this arrangement fluid under pressure is transmitted to and returned from the actuator 5 according to the position of the valve as the valve is operated by the control stick 23 thereby to control the movement of the aileron 12.

As more clearly shown on FIG. 2 suitable annular cover members 51 close the passageways or fluid chambers 48 and 48' and annular sealing devices 52 carried by the casing 27 and disposed on opposite sides of the cavity 31 in sealing engagement with the tubular shaft 44 provide a leak-proof seal therebetween.

From the foregoing, it will be apparent that a new and improved rotary actuator has been devised utilizing closely fitted roller or ball bearing and sealing means at each side of the hydraulic vane cavity to eliminate internal leakage. The actuator includes two concentric shafts, the outer shaft being used to transmit torque and the inner shaft being used to support moment at one end thereof. A suitable clearance is provided between the inner and outer shafts in order that there will be no cross-loading from one shaft to the other shaft. The outer torque shaft is coupled with the race of the ball bearing by an annular member which in turn is keyed to the inner moment shaft. Spline faces on the torque shaft and annular member are used so that a minimum amount of moment will be transmitted due to deflections in the race of the bearings. In any event, the bearing is a support point and will have no deflection perpendicular to the longitudinal axis of the actuator, although it may have a slight rotation. Adjustment of the actuator may be made so that it has no backlash as might occur if a gearing arrangement were used to reduce the moment on the actuator shaft as heretofore practiced. Furthermore, since the moment shaft is internally connected to the torque shaft, the size of the actuator and drive is reduced a considerable amount over prior art devices. Thus, this type of construction eliminates the expensive sealing arrangement heretofore used and also brings the cost of the actuator within the cost range of the devices presently available for torque and light moment service.

Obviously many modifications and variations of the present invention are possible in the light of the above teachings. It is, therefore, to be understood that within the scope of the appended claims the invention may be practiced otherwise than as specifically described.

What is claimed is:
1. A fluid operated rotary actuator comprising
a tubular shaft rotatably mounted within said casing,
a tubular sleeve rotatably mounted within said casing and driven by said tubular shaft,
an operating shaft disposed within the casing and concentric with said tubular shaft in spaced relation with respect thereto,
bearing means disposed within the casing and supporting said operating shaft and the tubular sleeve,
toothed means on one end of the tubular shaft,
complementary toothed means on the tubular sleeve in engagement with said toothed means on the tubular shaft for providing a driving connection therebetween,
key means carried by said tubular sleeve in engagement with said operating shaft for providing a driving connection therebetween,
fluid actuated impeller means on the tubular shaft for rotating the tubular shaft according to the direction of flow of fluid under pressure into said casing,
means for providing a fluid pressure connection to the casing, and
means carried on said casing in sealing engagement with the tubular shaft for providing a sealing connection therebetween.

2. A fluid operated rotary actuator comprising
a casing,
a tubular shaft rotatably mounted within said casing,
a tubular sleeve rotatably mounted within said casing and driven by said tubular shaft,
an actuating shaft disposed within the casing and concentric with said tubular shaft in spaced relation with respect thereto,
bearing means disposed within the casing and supporting said actuating shaft and the tubular sleeve,
toothed means on one end of the tubular shaft,
complementary toothed means on the tubular sleeve in engagement with said toothed means on the tubular shaft for providing a driving connection therebetween,
key means carried by said tubular sleeve in engagement with said actuating shaft for providing a driving connection therebetween,
a fluid cavity formed within said casing,
fluid actuated impeller means on the tubular shaft and disposed within said cavity for rotating the tubular shaft according to the direction of flow of fluid under pressure into the casing,
port means in communication with said cavity for porting said fluid under pressure into and out of said cavity,
control means in communication with said port means for controlling said flow of fluid pressure into and out of the cavity, and
means carried on said casing in sealing engagement with said tubular shaft for sealing the tubular shaft on each side of said cavity.

References Cited by the Examiner
UNITED STATES PATENTS

| | | | |
|---|---|---|---|
| 2,708,907 | 5/1955 | Shafer | 92—122 |
| 2,780,432 | 2/1957 | Shafer | 92—122 |
| 2,870,748 | 1/1959 | Hemphill | 244—85 X |
| 3,112,902 | 12/1963 | Kongelbeck | 244—14 |

BENJAMIN A. BORCHELT, *Primary Examiner.*

V. R. PENDEGRASS, *Assistant Examiner.*